United States Patent [19]
Saleh et al.

[11] Patent Number: 6,163,701
[45] Date of Patent: Dec. 19, 2000

[54] SYSTEM AND METHOD FOR PROVIDING LOCATION INFORMATION OF A MOBILE STATION IN A COMMUNICATION SYSTEM

[75] Inventors: Bilal A. Saleh, Prospect Heights; Antony D. Susai, St. Charles, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,461

[22] Filed: Jul. 25, 1997

[51] Int. Cl.[7] ..................................................... H04Q 7/20
[52] U.S. Cl. ........................... 455/456; 455/426; 455/422
[58] Field of Search .................... 455/432, 435, 455/436, 437, 438, 439, 440, 442, 456, 426, 404, 457, 422

[56] References Cited

U.S. PATENT DOCUMENTS

| | | | |
|---|---|---|---|
| 5,353,331 | 10/1994 | Emery et al. | 379/58 |
| 5,768,686 | 6/1998 | LeBlanc et al. | 455/456 |
| 5,790,952 | 8/1998 | Seazholtz et al. | 455/466 |
| 5,815,814 | 9/1998 | Dennison et al. | 455/456 |
| 5,844,522 | 12/1998 | Sheffer et al. | 455/32.1 |
| 5,854,982 | 12/1998 | Chambers et al. | 455/445 |
| 5,857,155 | 1/1999 | Hill et al. | 455/440 |

OTHER PUBLICATIONS

GSM Technical Specification, GSM 02.78, Nov. 1996, Version 5.10, Digital Cellular Telecommunications System (Phase 2+); Customized Applications for Mobile Network Enhanced Logic (CAMEL); Service definition (Stage 1) (GSM 02.78), ETSI.

GSM, TS 03 64 v.2.1.1, Digital Cellular Telecommunications System (Phase 2+); General Packet Radio Service (GPRS); Overall Description of the GPRS Radio Interface; Stage 2 (GSM 03.64 version 2.1.1).

European Telecommunication Standard, ETS 300 627, Nov. 1996, Digital Cellular Telecommunication system (Phase 2); Subscriber and Equipment Trace (GSM 12.08); ETSI.

GSM Technical Specification, GSM 09.78, Apr. 1997, Version 5.0.0., Digital Cellular Telecommunications System (Phase 2+); CAMEL Application Part (CAP) Specification (GSM 09.78). ETSI.

GSM Technical Specification, GSM 03.78, Sep. 1996, Version 0.10.0, Digital Cellular Telecommunications System (Phase 2+); Customised Applications for Mobile Network Enhanced Logic (CAMEL) (GSM 03.78). ETSI.

*Primary Examiner*—Doris H. To
*Attorney, Agent, or Firm*—Kenneth A. Haas

[57] ABSTRACT

A system (101) interconnects with a communication system via standard interfaces to provide location information related to a mobile station (103) within the communication system. The system (101) includes location device equipment (121) which generates raw location information of the mobile station (103) based on input received from a message compatible with the communication system. The system (101) also includes a mediation device (118) which stores location information related to the mobile station (103) and also interfaces with radio control functionality within the communication system. The system (101) further includes a location calculator (124) which determines the location information related to the mobile station (103) based on the raw location information of the mobile station (103) and which also provides the location information related to the mobile station (103) to the mediation device (118) for storage and to an intelligent network device (106) for use in location based services (127).

9 Claims, 3 Drawing Sheets

SYSTEM AND METHOD FOR PROVIDING LOCATION INFORMATION OF A MOBILE STATION IN A COMMUNICATION SYSTEM

FIELD OF THE INVENTION

The present invention relates, in general, to communication systems and, more particularly, to providing location information of mobile stations in such communication systems.

BACKGROUND OF THE INVENTION

The primary problem associated with location-based services is the lack of an open and interoperable architecture for the collection, storage, and presentation of location data on a per mobile station basis. The problem can be decomposed into five specific problem areas. The first problem area is the service problem, where there exists no standard means for the service logic to trigger the network to collect call-related RF data and location determination equipment (LDE) to collect location-related RF data. The second problem area is the radio problem, where there exists no defined standard which allows a base station subsystem (BSS) and an LDE to share call-related RF data. The third problem area is the network problem, where there exists no defined standard which allows all types of data (call-related RF data, location-related RF data, service-related data, etc.) associated with location services to be transported and presented to different network elements which need to access them. The fourth problem area is the synchronization problem, which manifests itself due to the dynamic nature of the mobile communication system (call handoff and termination are examples of dynamic events). The synchronization problems prevent the service logic from correlating data and events for a specific mobile station within the communication system, which itself may result in a false location determination of the mobile station. Finally, the fifth problem area is the mobility management problem, where there exists no standard means for the trigger, collection, and transfer of call-related data as the mobile station being located is handed-over between network elements.

Thus, a need exists for a method and system to provide location information of a mobile station which overcomes the above deficiencies.

DETAILED DESCRIPTION OF THE PREFERRED EMBODIMENT

Figure 1:
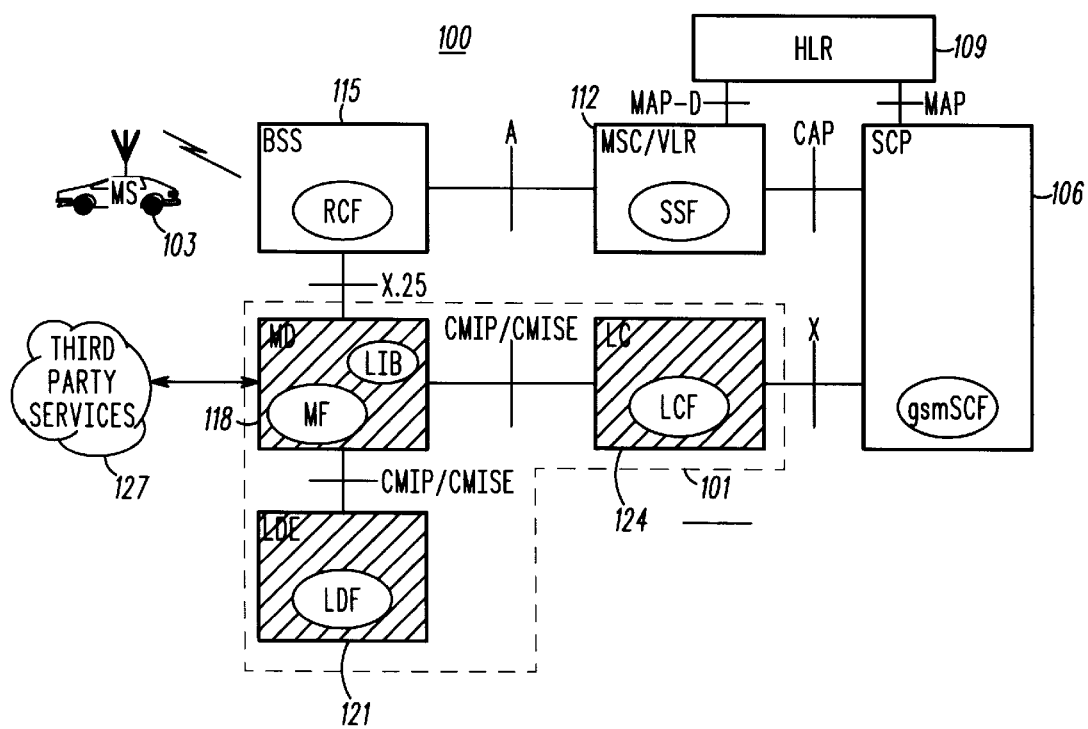
FIG. 1 generally depicts a preferred embodiment system architecture including network entities and functional entities which provide location information of a mobile station in accordance with the invention.

A system interconnects with a communication system via standard interfaces to provide location information related to a mobile station within the communication system. The system includes location device equipment which generates raw location information of the mobile station based on input received from a message compatible with the communication system. The system also includes a mediation device which stores location information related to the mobile station and also interfaces with radio control functionality within the communication system. The system further includes a location calculator which determines the location information related to the mobile station based on the raw location information of the mobile station and which also provides the location information related to the mobile station to the mediation device for storage and to an intelligent network device for use in location based services.

The mediation device is coupled to a base station system which provides the radio control functionality for communicating to the mobile station. The mediation device is further coupled to third party services which utilize the location information related to the mobile station stored therein. The location information related to the mobile station and stored in the mediation device is updated based on the requirements of the third party services. Channel and call related information is provided to the location device equipment via a message compatible with the communication system. In the preferred embodiment, the communication system is a GSM digital communication system and the message is a CALL TRACE message which gathers channel and call related information. The CALL TRACE message to gather channel and call related information is triggered via a CALL TRACE REQUEST message originated from the intelligent network.

Generally stated, a method of providing location information related to a mobile station in a communication system to third party services includes the steps of analyzing a request for location based services related to the mobile station and requesting a location of the mobile station based on those services supported by the mobile station. The method further includes the steps of invoking, via a request message, the gathering of raw location information of the mobile station using channel and call related information associated with the mobile station and determining final location information related to the mobile station utilizing the raw location information of the mobile station to provide the final location information to the third party services. The analyzing further comprises the step of analyzing a service key and CAMEL subscriber information (CSI) associated with the mobile station. The channel and call information used to gather raw location information of the mobile station is provided to location determination functionality via a CALL TRACE message. The method applies equally to mobile stations which are compatible with a GSM digital communication system, a GSM-based GPRS digital communication system, a CDMA digital communication system or a personal communication system.

FIG. 1 generally depicts a preferred embodiment system architecture 100 including network entities and functional entities which provide location information of a mobile station 103 in accordance with the invention. In the preferred embodiment, the system architecture 100 is based on the Global System for Mobile Communication (GSM) digital communication system, as is well known in the art. The network entities, and their related intercoupling and functionality, are described below. Also for clarity, a list of abbreviations for the network entities and their related functionality are provided below.

| | |
|---|---|
| MS | Mobile Station |
| SCF | Service Control Point |

-continued

| | |
|---|---|
| gsmSCF | GSM Service Control Function |
| HLR | Home Location Register |
| MSC/VLR | Mobile Switching Center/Visitor Location Register |
| SSF | Service Switching Function |
| BSS | Base Station Subsystem |
| RCF | Radio Control Function |
| MD | Mediation Device |
| MF | Mediation Function |
| LIB | Location Information Base |
| LDE | Location Determination Equipment |
| LDF | Location Determination Function |
| LC | Location Calculator |
| LCF | Location Control Function |
| CAMEL | Customized Application for Mobile Enhanced Logic |
| CSI | CAMEL Subscriber Information |

Referring to FIG. 1, a service control point (SCP) 106 is coupled to a home location register (HLR) 109 via a GSM-based "MAP" interface as is well known in the art. In the preferred embodiment, the SCP 106 is based on the Customized Application for Mobile Enhanced Logic (CAMEL) intelligent network model as defined in "GSM Recommendation 02.78 titled Digital Cellular Telecommunications System (Phase 2+); Customized Applications for Mobile network Enhanced Logic (CAMEL); Service definition (Stage 1)", "GSM Recommendation 03.78 titled Digital Cellular Telecommunications System (Phase 2+); Customized Applications for Mobile network Enhanced Logic (CAMEL)" and "GSM Recommendation 09.78 titled Digital Cellular Telecommunications System (Phase 2+); CAMEL Application Part (CAP) Specifications" the disclosure of which are herein incorporated by reference. The SCP 106 provides a GSM service control function (gsmSCF) as is defined in the above cited GSM Recommendation 03.78.

As is also well known in the art, both SCP 106 and HLR 109 are coupled to the Mobile Switching Center (MSC)/Visitor Location Register (VLR) 112 via the CAMEL-based "CAP" interface and the GSM-based "MAP-D" interface respectively. The MSC/HLR 112 provides a service switching function (SSF) and is itself coupled to a base station subsystem (BSS) 115 via the GSM-based "A" interface. While not shown in FIG. 1, it is well known to those skilled in the art that BSS 115 is primarily responsible for providing services for communicating to MS 103, such services including, inter alia, communication set-up, channel assignment and radio frequency (RF) transmission and reception. Such functions are generally referred to as radio control functions (RCFs). To provide such RCF functionality, BSS 115 is comprised of a base station controller (BSC) and a base transceiver station (BTS), both of which are well known and thus not shown for clarity. The SCP 106, HLR 109, MSC/VLR 112 and BSS 115 generally comprise a typical GSM digital communication system as is well known in the art.

FIG. 1 also includes a mediation device (MD) 118, location determination equipment (LDE) 121 and a location calculator (LC) 124 which provide location information related to MS 103 in accordance with the invention. As shown in FIG. 1, the MD 118 is coupled to the BSS 115 via International Telecommunication Union (ITU) standard "X.25". The MD 118 further includes a mediation function (MF), and the X.25 interface is used to transfer data from the RCF of the BSS 115 to the MF of the MD 118. The MD also includes a location information base (LIB) which is essentially a management information base (MIB), as defined by ITU's Telecommunications Management Network (TMN) Recommendations M.3100, M.3200 and M.3400. As described with reference to FIG. 1, the LIB functionality is used as a location information focal point for the storage and retrieval of location data in accordance with the invention.

Also coupled to the MD 118 is location determination equipment (LDE) 121 and location calculator (LC) 124. The LDE 121 is a hardware 10 and/or software element which includes a location determination function (LDF). The LDF is a functional entity which interfaces with the LIB and collects raw location information related to the MS 103 which is eventually stored in the LIB. The LC 124 includes a location calculation function (LCF) which calculates the final location of MS 103 based on the raw location information captured by the LDE and stores the final location information of the MS 103 in the LIB. The LCF also interfaces with the gsmSCF of the SCP 109 which allows the gsmSCF to obtain location information for a specific mobile station, for example MS 103 in accordance with the invention. As can be seen in FIG. 1, the LC 124 is coupled to the SCP 109 via the "X" interface. This is a TCAP-based interface which is used by the LCF to report final location information from the LCF to the gsmSCF, but may likewise be used by the gsmSCF to query the LCF to obtain location information related to MS 103 in accordance with the invention.

The functional entity LDF within LDE 121 and the functional entity LCF within LC 124 are coupled to the functional entity MF within the MD 118 via an ITU-based "CMIP/CMISE" interface. For the LDF-to-MF coupling, the CMIP/CMISE interface is used by the LDF to retrieve call-related RF data from the LIB via the MF and store raw location information in the LIB via the MF. For the LCF-to-MF coupling, the CMIP/CMISE interface is used by the LCF to retrieve raw location-related data from the LIB via the MF and store final location data in the LIB via the MF.

The MF within the MD 118 is a functional entity which allows access to LIB. As shown in FIG. 1, the entities RCF, LCF, LDF, and gsmSCF access the LIB via the MF. Essentially, the MF acts as a converter between the RCF and other functional entities such as the LDF and the LCF and provides access to the LIB through the CMIP/CMISE interface. The MF implements a point code addressing scheme which is used by the RCF to identify where data is to be routed.

In the preferred embodiment, the LDF within the LDE 121 collects and reports raw location information of a RF channel which is assigned to communicate to a specific mobile station, for example MS 103. In the preferred embodiment, the LDE 121 and its corresponding LDF are shown separate from the BSS 115 and the MS 103, but one skilled in the art will appreciate that it could equally be embedded in the MS 103, in the BSS 115, or be distributed across each of the MS 103 and the BSS 115. Multiple LDFs may be used to locate MS 103.

The LCF within the LC 124 obtains raw location information of the particular RF channel from the LIB and performs algorithmic calculations on the information to compute the final location of the MS 103 associated with the particular RF channel. The LCF then stores this final location information in the LIB. As stated above, multiple LDFs may cooperate to collect location information for a single MS. In this scenario, the LCF correlates all data feeds from all LDFs to a specific MS. The LCF is responsible for delivering the current location information related to the MS 103 based on the identity of the MS 103. In the preferred embodiment, the identity of the MS 103 is provided via an international mobile station identification (IMSI) parameter or a temporary mobile station identification (TMSI) parameter. The IMSI and TMSI parameters are described in GSM Recommendation 04.08.

The LIB is the data focal point for all location services supported by the system architecture 100 in accordance with the invention. The structure of the LIB is based on ITU's telecommunication management network (TMN) specifications which allows for modeling of the MS 103 as a managed object (MO). Each MO is described in the LIB in terms of its attributes, behavior, operations, notifications, etc. One key attribute of MS 103 as a MO is the location of MS 103. The LIB uses Management Applications that provide controlled access to the location information data. For example, a third party service 127 (which is a location based service) has the privilege to query the LIB to find out how many mobile stations are available in a certain area without knowing the identity of these mobiles. This access is accomplished via the ITU-based "CMIP/CMISE" interface.

For the LDE 121 to collect raw RF data for the specific MS 103, the LDE 121 needs to know the exact channel and call information associated with the specific MS 103. So that the system in accordance with the invention is compatible with the GSM digital communication system, the "CALL TRACE" facility as described in "GSM 12.08 78 Digital cellular telecommunications system (Phase 2+); Subscriber and Equipment Trace" is used to collect and report call-related RF data to the LDE 121. The MSC/VLR 112 initiates the CALL TRACE after data is stored in the LIB and thus the LDE 121 has access thereto.

In one scenario where location information related to MS 103 is obtained, the gsmSCF identifies a call to MS 103 as requiring a location service via the "SERVICE KEY" which is part of the CAMEL Subscriber Information (CSI). The concept of the service key and the CSI is described in the above-mentioned GSM Recommendation 02.78, but generally, the service key identifies the location based service to be invoked. The gsmSCF requests location information of the specific MS 103 either during call setup (origination or termination) or after the call is connected. After identifying the call as requiring location services, the gsmSCF instructs the MSC/VLR 112 to initiate a CALL TRACE. Upon receiving instructions from the gsmSCF to initiate the CALL TRACE, the SSF within the MSC/VLR 112 triggers the RCF within the BSS 115 to begin a call trace for a given call.

From the MS and BSS perspective, the call setup procedure for a CAMEL subscriber (i.e., MS 103) is no different than the call setup procedure for any other subscriber. When MS 103 is identified to be a CAMEL subscriber, the MSC/VLR 112 initiates the first contact with the gsmSCF and passes to it the CSI of MS 103 which contains the SERVICE KEY. If the SERVICE KEY indicates that the service is a location service, the gsmSCF instructs the MSC/VLR 112 to initiate a CALL TRACE at the BSS 115 to collect location data. To initiate this CALL TRACE, a new message "TRACE CALL REQUEST" is introduced which identifies the destination of the network element which will receive the CALL TRACE data as well as the type of data to be collected.

For location services, the CALL TRACE data which is relevant includes mobile station identity (IMSI, TMSI), radio channel information, timing advance and power control information, base station identity code of the cell in which the call is established and measurement report data. The MSC/VLR 112 uses the CALL TRACE data type received from the gsmSCF to instruct the BSS 115 to collect only the required call related data so as not to impact the signaling performance of the BSS 115 and its associated link "A" interface link to the MSC/VLR 112. Stated differently, only the minimum amount of data is requested to keep the amount of signaling to a minimum.

The MSC can also invoke a CALL TRACE at the BSS 115 for a call in which a Signaling Connection Control Part (SCCP) connection has already been established. At the invocation of CALL TRACE, the BSS 115 starts collecting CALL TRACE data and forwards the data to the MD 118 which in turn triggers the location data collection at the LDE 121 and location determination at the LC 124. The LC 124 establishes a call relationship with the gsmSCF for the call in which location information related to MS 103 is desired. Location data collected at the LDE 121 is forwarded to the LC 124 via the LIB within the MD 118. Using the location data, the LC 124 computes the location information and passes this information to the gsmSCF.

As shown in FIG. 1, third party services 127 are easily connected to the MD 118 in accordance with the invention. In prior art systems, the location information was buried in the MSC/VLR 112 and not available to third parties who can beneficially employ the location information. By coupling MD 118, LDE 121 and LC 124 to the known prior art communication system, the location information is easily accessed by any third party service 127 which can leverage the use of the location information. As such, depending on the service which requires location information, the determination of location may be a either a continuous event for the life time of a call or can be terminated if continuous location determination is not needed for the call. In the latter scenario, the LC 124 decides to cease data gathering via CALL TRACE at the BSS 115 either via the MD 118 or the MSC/VLR 112. As such, data gathering for location determination (and thus location determination itself) in accordance with the invention is dependent upon the requirements of third party services 127 requesting such location information.

Figure 2:
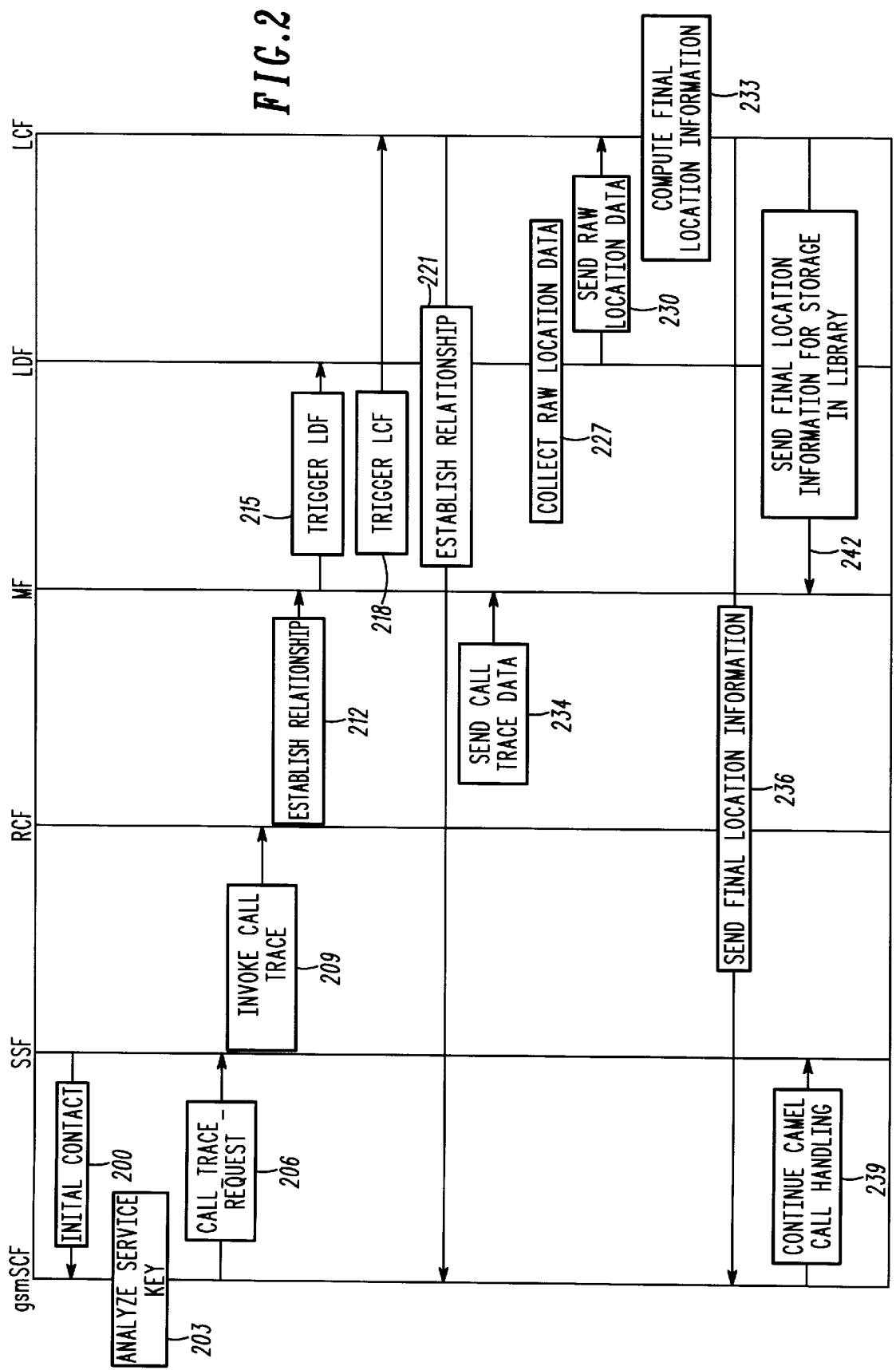
FIG. 2 generally depicts an exemplary call flow diagram which provides location information of a mobile station in accordance with the invention.

FIG. 2 generally depicts an exemplary call flow diagram which provides location information of a mobile station in accordance with the invention. For clarity, the description of FIG. 2 is provided in terms of the functionality of each of the network elements shown in FIG. 1. For a mobile originated or terminated call, the SSF initiates the first contact with the gsmSCF and passes the CSI of the MS 103 to it. The gsmSCF analyzes 203 the SERVICE KEY of the CSI and if the SERVICE KEY indicates a location service, the gsmSCF instructs 206 the SSF to trigger the BSS 115 to trace the call via the TRACE CALL REQUEST message.

Upon receiving the TRACE CALL REQUEST message from the gsmSCF, the SSF triggers the RCF of BSS 115 to invoke a CALL TRACE as described in the above-mentioned "GSM 12.08 78 Digital cellular telecommunications system (Phase 2+); Subscriber and Equipment Trace." At this point, the CALL TRACE must include the IMSI and TMSI of MS 103. The SSF passes the address of the MD to the RCF as part of the TRACE CALL REQUEST message. A relationship between the BSS 115 and the MD 118 is established 212 which indicates the start of a CALL TRACE. The MF of the MD 118 notifies/triggers 215 the LDF of LDE 121 and notifies/triggers 218 the LCF of LC 124 of an incoming call which requires location determination. Within the triggering identified at step 215, channel and call related information associated with the particular MS 103 is provided to the LDE 121 via the CALL TRACE message. A relationship between the LCF and the gsmSCF is then established 221 and the RCF then sends 224 the CALL TRACE data to the LIB of the MD 118 via the MF for storage in the LIB.

Next, LDF of the LDE 121 retrieves the call-related RF data from the LIB and then collects 227 raw location data. The raw location data collected is then stored in the LIB. The raw location data is retrieved 230 by the LCF from the LIB where the final location information is computed 233. The final location information is then sent 236 to the gsmSCF and is also stored in the LIB for use by third party services 127 as required. Once the gsmSCF receives the final location information, the gsmSCF continues 239 the handling of the call as a normal CAMEL call. The final location information is also sent 242 to the LIB within the MD for storage, where it can be accessed and beneficially utilized in accordance with the invention by third party services 127 coupled to the MD.

Location information access for a call in progress is provided to the gsmSCF during call setup as described in with reference to FIG. 2. Location information is updated and stored in the LIB after the call is connected for the duration of the call. If the gsmSCF requires location updates after the call is connected, it must query the LDF of the LC 124. As such, the LC 124 supports synchronous location update (i.e., a request and response) as well as asynchronous location update (i.e., timer-based or event-based updates). The gsmSCF uses the IMSI or TMSI of the mobile station to identify the MS 103 to be located.

Figure 3:
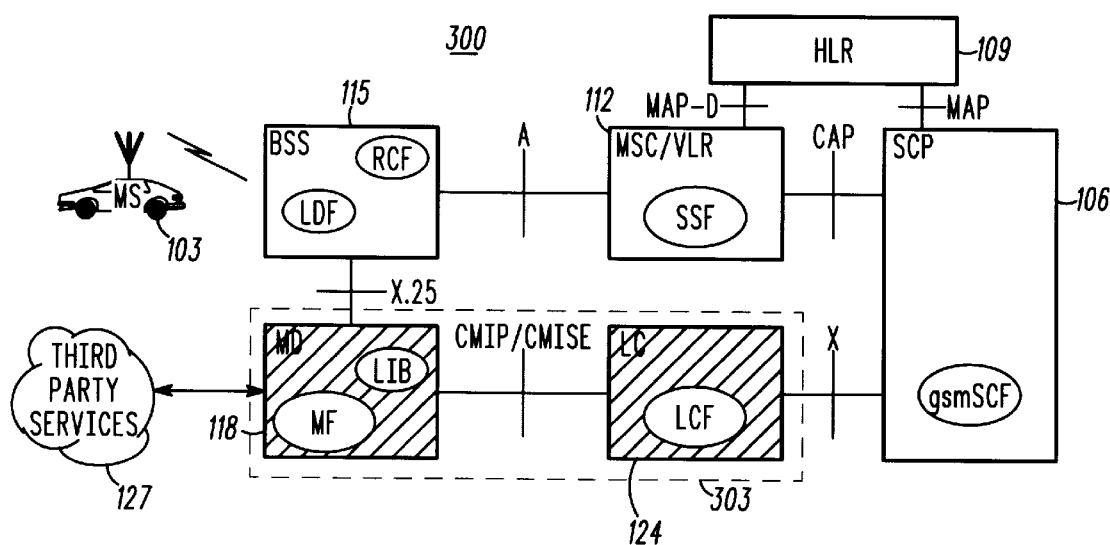
FIG. 3 generally an alternate embodiment system architecture where the LDF functionality is provided in the BSS of FIG. 1 to provide location information of a mobile station in accordance with the invention.

In an alternate embodiment, the LDF can be implemented as part of the RCF within the BSS 115. FIG. 3 generally depicts this alternate embodiment system architecture 300 where the LDF functionality is provided in the BSS of FIG. 1 to provide location information of a mobile station in accordance with the invention. For the sake of clarity, the LDF and the RCF are shown as having separate functionality within the BSS 115. However, the operation and call flow as described with reference to FIG. 2 is exactly the same; the only difference between the architecture of FIG. 1 and FIG. 3 is the location of the LDF. In this embodiment, the apparatus in accordance with the invention can logically be thought of as the configuration of the MD 118 and the LC as shown by the line 303.

The technique of providing location information related to a mobile station is not limited by the type of mobile station employed. For example, the mobile station could be a mobile station compatible with a code division multiple access (CDMA) digital communication system as defined in TIA/EIA/IS-95-A, "Mobile Station-Base Station Compatibility Standard for Dual Mode Wideband Spread Spectrum Cellular System," March 1995 or could likewise be a mobile station compatible with ANSI J-STD-008, "Personal Station-Base Station Compatibility Requirements for 1.8 to 2.0 GHz Code Division Multiple Access (CDMA) Personal Communication Systems," August 1995. Additionally, while the preferred embodiment has been described in relation to a GSM digital communication system, different versions of such a system continue to evolve. One proposal currently being considered for a GSM-based system currently evolving is defined in the European Telecommunications Standards Institute (ETSI) draft document TS 03 64, V2.1.1 titled "Digital Cellular Telecommunications System (Phase 2+); General Packet Radio Service (GPRS); Overall Description of the GPRS Radio Interface; Stage 2 (GSM 03.64, version 2.1.1)." The architecture proposed in accordance with the invention is compatible to provide location information related to any one of these types of mobile stations in accordance with the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A system for providing location information related to a mobile station in a communication system, the system comprising:

location device equipment for generating raw location information of the mobile station, wherein the raw location information is based on channel and call information received from a CALL TRACE GSM message;

a mediation device, coupled to the location device equipment, for storing location information related to the mobile station and for interfacing with radio control functionality;

a location calculator, coupled to the mediation device and an intelligent network device, for determining final location information related to the mobile station based on the raw location information of the mobile station and for providing the final location information related to the mobile station to the mediation device for storage, to the intelligent network device for use in location based services, and to third party services which utilize the final location information related to the mobile station stored therein.

2. The system of claim 1, wherein the mediation device is further coupled to a base station system which provides the radio control functionality for communicating to the mobile station.

3. The system of claim 1, wherein the final location information related to the mobile station and stored in the mediation device is updated based on the requirements of the third party services.

4. The system of claim 1, wherein channel and call related information is provided to the location device equipment via a message compatible with the communication system.

5. A system for providing location information related to a mobile station in a communication system to third party services, the system comprising:

a mediation device, having as an input raw location information of the mobile station, for storing final location information related to the mobile station and for interfacing with radio control functionality, wherein the raw location information is based on channel and call information received from a CALL TRACE GSM message;

a location calculator, coupled to the mediation device and an intelligent network device, for determining the location information related to the mobile station based on the raw location information of the mobile station and for providing the location information related to the mobile station to the mediation device for storage, to the intelligent network device for use in location based services, and to third party services which utilize the location information related to the mobile station stored therein.

6. The system of claim 5, wherein the raw location information of the mobile station is generated by location device equipment having location determination functionality.

7. The system of claim 6, wherein the location device equipment having location determination functionality is located either internal or external to a base station subsystem.

8. The system of claim 5, wherein the final location information related to the mobile station and stored in the mediation device is updated based on the requirements of the third party services.

9. The system of claim 5, wherein channel and call related information is provided to the location device equipment via a message compatible with the communication system.

* * * * *